United States Patent
Ketyko et al.

(10) Patent No.: US 12,045,728 B2
(45) Date of Patent: Jul. 23, 2024

(54) METHOD AND APPARATUS FOR PROCESSING SENSOR DATA

(71) Applicant: Nokia Technologies OY, Espoo (FI)

(72) Inventors: Istvan Ketyko, Budapest (HU); Ferenc Kovacs, Erd (HU)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/047,075

(22) Filed: Oct. 17, 2022

(65) Prior Publication Data

US 2023/0060572 A1 Mar. 2, 2023

Related U.S. Application Data

(63) Continuation of application No. 16/863,507, filed on Apr. 30, 2020, now Pat. No. 11,474,611.

(30) Foreign Application Priority Data

Jul. 26, 2019 (EP) ..................... 19188503

(51) Int. Cl.
*G06F 17/00* (2019.01)
*G06F 3/01* (2006.01)
(Continued)

(52) U.S. Cl.
CPC .............. *G06N 3/088* (2013.01); *G06F 3/015* (2013.01); *G06F 3/017* (2013.01); *G06F 18/214* (2023.01);
(Continued)

(58) Field of Classification Search
CPC ........ G06F 18/214; G06N 3/08; G06N 20/00; G06N 3/044; G06N 3/045
(Continued)

(56) References Cited

U.S. PATENT DOCUMENTS 10,990,174 B2 4/2021 Kaifosh et al.
2017/0259428 A1* 9/2017 Assad .................... G16H 40/67
(Continued)

FOREIGN PATENT DOCUMENTS

CN 105654037 A 6/2016
WO WO-2015-034759 A1 3/2015

OTHER PUBLICATIONS

Akbari, Transferring Activity Recognition Models for New Wearable Sensors with Deep Generative Domain Adaptation', Association for Computing Machinery, 2019 (Year: 2019).*
(Continued)

*Primary Examiner* — Stephen S Hong
*Assistant Examiner* — Matthew J Ludwig
(74) *Attorney, Agent, or Firm* — Harness, Dickey & Pierce, P.L.C.

(57) ABSTRACT

In one embodiment, the method includes obtaining a plurality of sensor data items, each specifying a set of values determined from at least one sensor; and training, based on the plurality of sensor data items, a machine learning model including a data adaptation part configured for determining a modified sensor data item based on an input sensor data item, an encoder configured for determining encoded features based on the modified sensor data item, a decoder configured for determining a decoded sensor data item based on the encoded features, representing an estimation of the input sensor data item, and a classifier configured for determining a class associated with the input sensor data item. The training the machine learning model includes updating parameters of the data adaptation part based on the input sensor data item and the corresponding decoded sensor data item, while maintaining the encoder, the decoder and the classifier frozen.

12 Claims, 1 Drawing Sheet

(51) Int. Cl.
| | |
|---|---|
| *G06F 18/214* | (2023.01) |
| *G06F 18/2415* | (2023.01) |
| *G06F 18/2431* | (2023.01) |
| *G06N 3/08* | (2023.01) |
| *G06N 3/088* | (2023.01) |
| *G06N 20/00* | (2019.01) |
| *G06V 10/75* | (2022.01) |

(52) U.S. Cl.
CPC ...... *G06F 18/2415* (2023.01); *G06F 18/2431* (2023.01); *G06N 3/08* (2013.01); *G06N 20/00* (2019.01); *G06V 10/751* (2022.01)

(58) Field of Classification Search
USPC .......................................................... 715/863
See application file for complete search history.

(56) References Cited

U.S. PATENT DOCUMENTS

| | | | | |
|---|---|---|---|---|
| 2019/0314600 | A1* | 10/2019 | Patel | A61N 1/36025 |
| 2019/0348027 | A1* | 11/2019 | Berenzweig | G10L 15/14 |
| 2019/0384901 | A1* | 12/2019 | Osborn | G06F 3/017 |
| 2020/0012938 | A1 | 1/2020 | Malhotra et al. | |
| 2020/0176121 | A1* | 6/2020 | Dalal | G16H 20/60 |
| 2023/0141896 | A1* | 5/2023 | Liu | A61B 3/0025 |
| | | | | 351/246 |

OTHER PUBLICATIONS

Li, Revisiting Batch Normalization for Practical Domain Adaptation, ICLR 2017 (Year: 2017).*

Mohamed, Homogenous Cognitive Based Biometrics for Static Authentication, University of Victoria, published 2010 (Year: 2010).*

Zhang, A framework for Hand Gesture Recognition Based on Accelerometer and EMG Sensors, IEEE Transactions on Systems, Man, and Cybernetics, 2011 (Year: 2011).*

Notice of Allowance issued on Jun. 17, 2022 in U.S. Appl. No. 16/863,507.

Extended European Search Report issued Feb. 3, 2020 in European Application No. 19188503.7.

Wentao Sun et al., "sEMG-based Handgesture Classification Using a Generative Flow Model," Sensors, Apr. 25, 2019.

Ulysse Cote-Allard et al., "Deep Learning for Electromyographic Hand Gesture Signal Classification Using Transfer Learning," IEEE, Jun. 2018.

Junbao Zhuo et al., "Deep Unsupervised Convolutional Domain Adaptation," MM '17: Proceedings of the 25th ACM international Conference on Multimedia, Oct. 2017, pp. 261-269.

Angkoon Phinyomark et al., "EMG Pattern Recognition in the Era of Big Data and Deep Learning," Big Data Congnitive Computing, Aug. 1, 2018.

Yu Hu et al., "A Novel Attention-based hybrid CNN-RNN architecture for sEMG-based gesture recognition," PLOS One, Oct. 30, 2018.

Istv'an Ketyk'o et al., "Domain Adaptation for sEMG-based Gesture Recognition with Recurrent Neural Networks," IEEE, Nov. 28, 2019.

Yu Du et al., "Surface EMG-Based Inter-Session Gesture Recognition Enhanced by Deep Domain Adaptation," Sensors, Feb. 24, 2017.

Ali Farshchian et al., "Adversarial Domain Adaptation for Stable Brain-Machine Interfaces," 7th International Conference on Learning Representations, ICLR 2019, Jan. 1, 2019.

Examination/Communication pursuant to article 64(3) issued Mar. 27, 2024 in European Application No. 19188503.7.

* cited by examiner

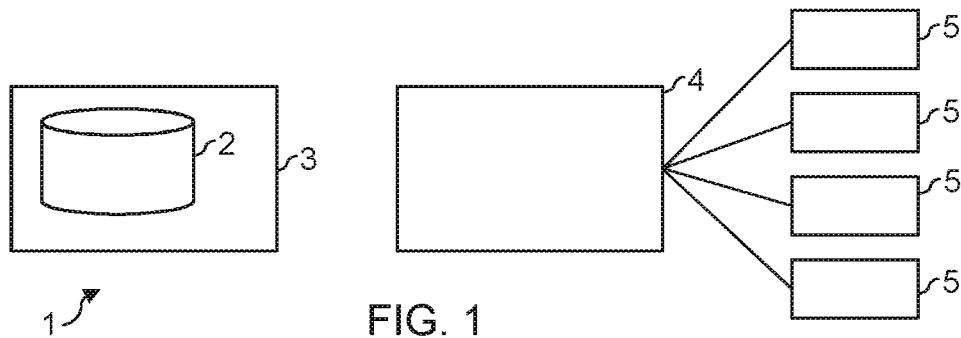
FIG. 1
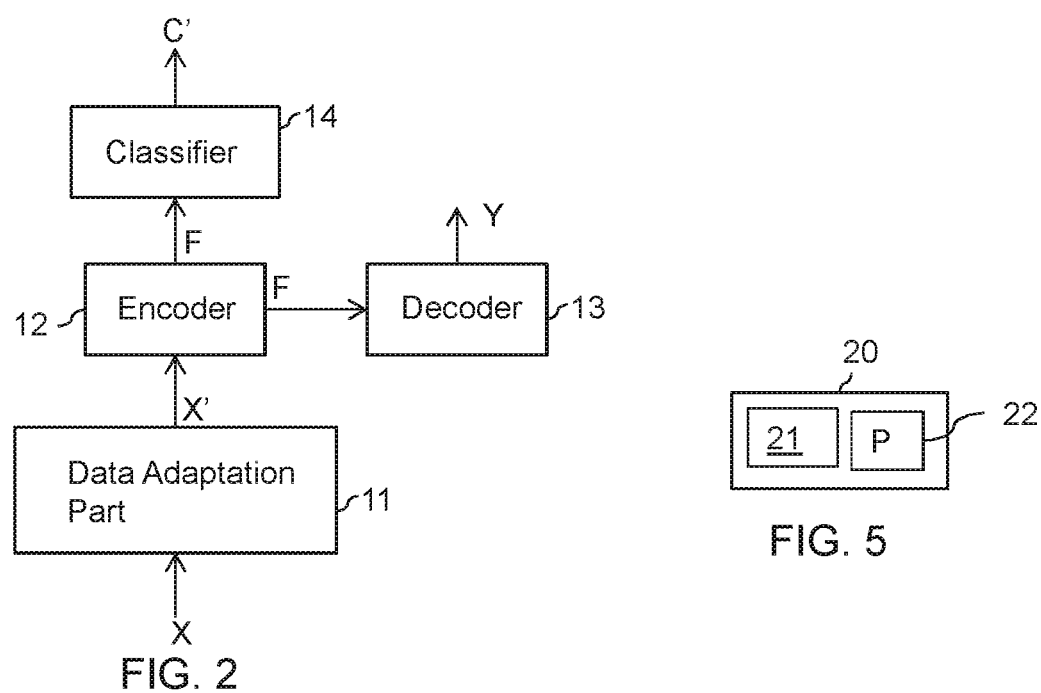
FIG. 2
FIG. 5
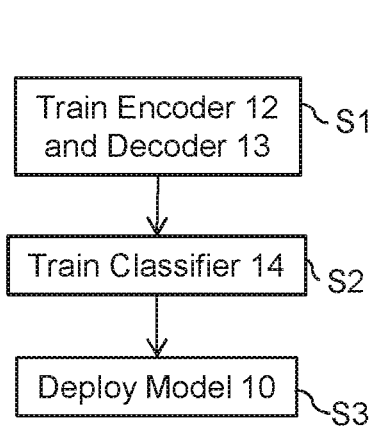
FIG. 3
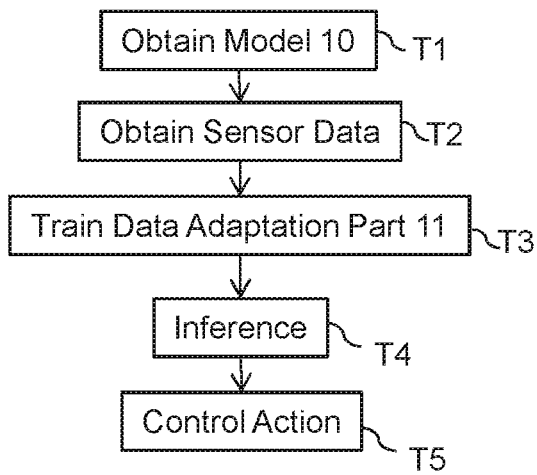
FIG. 4

METHOD AND APPARATUS FOR PROCESSING SENSOR DATA

CROSS-REFERENCE TO RELATED APPLICATIONS

The present application is a Continuation of U.S. application Ser. No. 16/863,507, filed on Apr. 30, 2020, which claims priority under 35 U.S.C. § 119 to European Patent Application No. 19188503.7, filed on Jul. 26, 2019, in the European Patent Office, the entire contents of each of which are hereby incorporated by reference.

FIELD OF THE INVENTION

The present invention relates to the field of sensor data processing. In particular, the present invention relates to a method and an apparatus for processing sensor data with a machine learning classifier.

BACKGROUND

Hand gesture recognition based on measuring and analyzing electric signals produced by the muscles involves placing sensors on the skin of the user. For example, it is possible to use Electromyography-based (EMG) sensors to record multi-variate time-series data. Supervised learning can be used to train a machine learning model capable of classifying a time-sequence of sensor values to one of a plurality of hand gestures: If the EMG sensors are placed to the lower arm of a user, then hand gestures such as the fist, spread fingers, finger pinches, wave-out and wave-in classes, etc. can be predicted.

EMG signals are extremely sensitive to sensing conditions, in particular to the placement of the electrodes. This means that in an inter-session scenario (the sensors are removed and put back on the same user) or an inter-subject scenario (the sensors are used by a new user), classification accuracy may deteriorate. Solutions based on domain adaptation have been proposed to maintain a good classification accuracy.

SUMMARY

It is thus an object of embodiments of the present invention to propose a method and an apparatus for processing sensor data, which do not show the inherent shortcomings of the prior art.

Accordingly, embodiments relate to an apparatus comprising means configured for:
  obtaining a plurality of sensor data items, wherein a sensor data item specifies a set of values determined from at least one sensor,
  training, based on the plurality of sensor data items, a machine learning model configured for classifying sensor data items, wherein the machine learning model comprises:
    a data adaptation part configured for determining a modified sensor data item based on an input sensor data item,
    an encoder configured for determining encoded features based on the modified sensor data item,
    a decoder configured for determining a decoded sensor data item based on the encoded features, representing an estimation of the input sensor data item, and
    a classifier configured for determining a class associated with the input sensor data item,
  wherein training the machine learning model comprises updating parameters of the data adaptation part based on a comparison between an input sensor data item from the plurality of sensor data items and the corresponding decoded sensor data item, while maintaining the encoder, the decoder and the classifier frozen.

Also, embodiments relate to a computer-implemented method comprising:
  obtaining a plurality of sensor data items, wherein a sensor data item specifies a set of values determined from at least one sensor,
  training, based on the plurality of sensor data items, a machine learning model configured for classifying sensor data items, wherein the machine learning model comprises:
    a data adaptation part configured for determining a modified sensor data item based on an input sensor data item,
    an encoder configured for determining encoded features based on the modified sensor data item,
    a decoder configured for determining a decoded sensor data item based on the encoded features, representing an estimation of the input sensor data item, and
    a classifier configured for determining a class associated with the input sensor data item,
  wherein training the machine learning model comprises updating parameters of the data adaptation part based on a comparison between an input sensor data item from the plurality of sensor data items and the corresponding decoded sensor data item, while maintaining the encoder, the decoder and the classifier frozen.

A sensor data items may specify a time-sequence of values from at least one sensor.

The encoder and/or the decoder may comprise a recurrent neural network.

The comparison between an input sensor data item from the plurality of sensor data items and the corresponding decoded sensor data item may comprise determining a mean square error.

In some embodiments, a sensor data item specifies a time sequence from electromyography electrodes, and wherein the classifier is configured for determining a hand gesture.

In some embodiments, said means are further configured for:
  inferring a class associated with a sensor data item, based on the trained machine learning model, and
  controlling the execution of an action based on the inferred class.

Controlling the execution of an action based on the inferred class may comprise providing a hand gesture-based user interface.

In some embodiments, said means are further configured for obtaining the machine learning model, wherein the encoder, the decoder and the classifier have been trained while maintaining the data adaptation part frozen, based on a labelled dataset specifying, for a plurality of sensor data items, a class label.

Embodiments also relate to an apparatus comprising means configured for:
  training, based on a labelled dataset, a machine learning model configured for classifying sensor data items,
    wherein the labelled dataset specifies a plurality of sensor data items and associated class labels, wherein a sensor data item specifies a set of values determined from at least one sensor, wherein the machine learning model comprises:
- a data adaptation part configured for determining a modified sensor data item based on an input sensor data item,
- an encoder configured for determining encoded features based on the modified sensor data item,
- a decoder configured for determining a decoded sensor data item based on the encoded features, representing an estimation of the input sensor data item, and
- a classifier configured for determining a class associated with the input sensor data item, wherein training the machine learning model comprises training the encoder, the decoder and the classifier while maintaining the data adaptation part frozen.

Also, embodiments relate to a computer-implemented method comprising:

training, based on a labelled dataset, a machine learning model configured for classifying sensor data items, wherein the labelled dataset specifies a plurality of sensor data items and associated class labels, wherein a sensor data item specifies a set of values determined from at least one sensor, wherein the machine learning model comprises:
- a data adaptation part configured for determining a modified sensor data item based on an input sensor data item,
- an encoder configured for determining encoded features based on the modified sensor data item,
- a decoder configured for determining a decoded sensor data item based on the encoded features, representing an estimation of the input sensor data item, and
- a classifier configured for determining a class associated with the input sensor data item, wherein training the machine learning model comprises training the encoder, the decoder and the classifier while maintaining the data adaptation part frozen.

Training the encoder, the decoder and the classifier while maintaining the data adaptation part frozen may comprise:
- updating parameters of the encoder and the decoder based on a comparison between input sensor data items and corresponding decoder sensor data items, and
- updating parameters of the classifiers based on a comparison between the classes determined for input sensor data items and the corresponding class labels.

The method may comprise deploying the machine learning model in a sensing apparatus.

Embodiments also relates to a system comprising a training apparatus as defined previously and at least one sensing apparatus as defied previously.

In some embodiments, said means include at least one processor and at least one memory, the at least one memory storing computer program code, the at least one memory and the computer program code being configured to, with the at least one processor, cause the apparatus to at least in part perform the functions discussed above.

Embodiments also relate to a computer program comprising instructions for performing the method mentioned before when said instructions are executed by a computer. The computer program may be stored on a computer readable medium. The computer readable medium may be a non-transitory computer readable medium.

The scope of protection sought for various embodiments of the invention is set out by the independent claims. The embodiments and features, if any, described in this specification that do not fall under the scope of the independent claims are to be interpreted as examples useful for understanding various embodiments of the invention.

BRIEF DESCRIPTION OF THE DRAWINGS

The above and other objects and features of the invention will become more apparent and the invention itself will be best understood by referring to the following description of embodiments taken in conjunction with the accompanying drawings wherein:

FIG. 1 is a block diagram of a system for processing sensor data,

FIG. 2 is a block diagram of a machine learning model used in the system of FIG. 1, FIGS. 3 and 4 are flowcharts of methods for processing sensor data in the system of FIG. 1, and FIG. 5 is a structural view of an apparatus used in the system of FIG. 1.

DESCRIPTION OF EMBODIMENTS

Domain adaptation is a field associated with machine learning and transfer learning. This scenario arises when we aim at learning from a source data distribution a well performing model on a different (but related) target data distribution.

For instance, one of the tasks of the Electromyography-based (EMG) gesture recognition problem consists in adapting a model from one user (the source distribution) to a new one who has different muscle physiology and/or different sensor placement (the target distribution). Indeed, it is very challenging to place all the EMG electrode sensors properly to the exact same area and there are physiological differences among human muscles. There are high inter-session and inter-person variances, so domain adaptation is desirable.

A domain adaptation technique for EMG-based gesture recognition may involve supervised domain adaptation. In other words, some labelled data for the target distribution is required.

Another domain adaptation technique for EMG-based gesture recognition may involve a multi-source adaptive batch normalization technique which works with a CNN architecture. The drawback of this solution is that in case of multiple sources (i.e., multiple subjects), constraints and considerations are needed per source at pre-training time of the model.

Embodiments described herein introduce an unsupervised domain adaptation architecture and a 3-stage unsupervised domain adaptation method for classification of sensor data. No labelled training data is needed for the target distribution, and no constraints or considerations per subjects is needed at pre-training time.

The classification task aims at classifying sensor data items specifying a set of values from at least one sensor. A set of values may be a time-sequence specifying successive values. The classification task may apply to univariate (the sequence specifies successive values for one variable) or multi-variate (the sequence specifies successive values for a plurality of variables) scenario.

Embodiments may relate to classification of various biosensor data, including Electromyography (EMG), Electroencephalography (EEG), Electrocardiography (ECG), Photoplethysmogram (PPG) . . . .

Embodiments may relate to classification of various IoT sensor data, for example for industrial environments, smart office, smart city, smart home . . . .

FIG. 1 is a block diagram of a system 1 for processing sensor data. The system 1 comprises a database 2 storing a labelled dataset, a training apparatus 3, a sensing apparatus 4 and one or more sensors 5.

The labelled dataset specifies a plurality of sensor data items X and, for the respective sensor data items X, a class label C. A sensor data item X specifies a plurality of values from at least one sensor. For example, a sensor data items X specifies a plurality of vectors $x_i$ of size N, for i=0 to M−1. The vectors $x_i$ may correspond to a time-sequences of length M. A vector $x_i$ of size N may correspond to N sensor values. Accordingly, a sensor data item X may be seen as a M×N matrix. In a univariate scenario, N=1 and in a multi-variate scenario, N>1. The class label C may be specified for example by a one-hot vector of size G where G is the number of classes: All the elements of C are equal to 0, except one element equal to 1 corresponding to the specified class.

In the example of electromyography-based gesture recognition, a sensor data item X specifies values from N electrodes placed on the user, at M successive times of a time period, and the class label C specifies the gesture executed by the user during this time period.

The labelled dataset may be obtained from external sources. For example, labelled dataset for the electromyography-based gesture recognition task have been generated and published by various researchers. Also, the labelled dataset may be generated by the system 1, for example by measuring sensor data and manually inputting the classes.

The labelled dataset includes sensor data items X corresponding to one or more sensing conditions. For example, EMG electrodes in a given position on a given user. This may be referred to as the source distribution.

The training apparatus 3 is a computing apparatus configured for training a machine learning model based on the labelled dataset. The machine learning model and training process are described hereafter with reference to FIGS. 2 and 3. The training apparatus 3 may be a server, for example in a cloud environment, a personal computer, a medical device including a computer, a smart phone . . . .

The sensing apparatus 4 is a computing apparatus, such as a server, for example in a cloud environment, a personal computer, a medical device including a computer, a smart phone . . . . The sensing apparatus 4 is connected to, or includes, one or more sensors 5. The sensors 5 provide measured values to the sensing apparatus 4. A sensor data item X may correspond to a set of values from the one or more sensors 5, for example to a time-sequence of values. The sensing apparatus 4 may be configured for acting or controlling an action based on the sensor data items X obtained from the sensors 5. For example, in the EMG-based gesture recognition context, the sensors 5 may measures EMG signals and the sensing apparatus 4 may provide a gestures-based user interface.

The plurality of sensors 5 may include sensors of the same type and/or of different types.

A sensor data item X measured by the sensing apparatus 4 and the sensors 5 may correspond to different sensing conditions than the sensor data items X of the labelled dataset. In other words, the sensor data items X measured by the sensing apparatus 4 and the sensors 5 and may correspond to a target distribution. For example, the sensors 5 are EMG electrodes placed on a different user. Accordingly, the sensing apparatus 4 is also configured for training the machine learning model. The training process involves domain adaptation and is described hereafter with reference to FIG. 4.

In some embodiments, the sensing apparatus 4 and the sensors 5 are part of a smart wearable user device, for example a sleeve.

In some embodiments, the training apparatus 3 and the sensing apparatus 4, which have been described as two distinct apparatuses, are the same apparatus.

FIG. 2 is a block diagram of a machine learning model 10 for processing sensor data. The machine learning model 10 comprises a data adaptation part 11, an encoder 12, a decoder 13 and a classifier 14. The machine learning model 10 is for example a neural network.

The data adaptation part 11 is configured for determining a modified sensor data item X' based on an input sensor data item X. The data adaptation part 11 is for example a fully connected neural network. It may have a non-linear activation function and it may be a for example a shallow (1-layer) network. The modified sensor data item X' may present the same format as the sensor data item X, for example a M×N matrix as discussed previously.

The encoder 12 is configured for determining encoded features based on the modified sensor data item X'. The encoded features may be specified by a feature vector F or a feature map F. The dimension of the feature vector/map F may be smaller than the dimension of the sensor data items X. For example, the encoded features are specified by a feature vector F of size L<M×N. The encoder 12 is for example a recurrent neural network (RNN).

The decoder 13 is configured for determining a decoded sensor data item Y based on the encoded features. The decoded sensor data item Y may present the same format as the sensor data item X, for example a M×N matrix as discussed previously. The decoder 13 is for example a recurrent neural network (RNN).

The decoded sensor data item Y represents an estimation of the input sensor data item X. In other words, the data adaptation part 11, the encoder 12 and the decoder 13 form together an autoencoder. In some embodiments, the encoder 12 and the decoder 13 present the architecture of a deep generative model, for example a sequential auto-encoder or a recurrent Generative Adversarial Network (GAN), to which a data adaptation part 11 is attached.

The classifier 14 is configured for determining a class associated with the input sensor data item X, based on the encoded features. In some embodiments, the classifier 14 consists in a unique SoftMax layer or in a fully connected neural network with a SoftMax layer at the end. The output of the classifier 14 may be for example a vector C' of size G (where G is the number of classes) representing a probability distribution function: for each class, an element of C' specifies the probability that the input sensor data item X is associated with the class. The class determined by the classifier 14 correspond to the element of C' specifying the highest probability.

Training of the machine learning model is performed in 3 stages, as described in more details with reference to FIGS. 3 and 4.

FIG. 3 is a flowchart of a method for training the machine learning model 10. In some embodiments, the method of FIG. 3 is executed by the training apparatus 3.

Before training, the machine learning model 10 may be in an initialization state. In some embodiments, random initialization is applied to the machine learning model 10. In some embodiments, random initialization is applied to the machine learning model 10, except for the data adaptation part 11 which is initialized to an "identity" state, e.g. such that X'=X.

The training apparatus 3 trains the encoder 12 and the decoder 13 based on the labelled dataset, while maintaining the data adaptation part 11 frozen (Step S1). Training is performed on the source distribution in an unsupervised manner (i.e. without the use of the class label). For example, sensor data items X from the labelled dataset are input to the model and corresponding decoded sensor data items Y are determined. Parameters of the encoder 12 and decoder 13 are updated based on a comparison between the sensor data items X and the decoded sensor data items Y. In contrast, parameters of the data adaptation part 11 are not updated at this stage. The comparison between sensor data items X and the sensor data items Y may be based on the average mean square error between X and Y. The comparison and update may be performed items by items or by batches.

Then, the training apparatus 3 trains the classifier 14 based on the labelled dataset, while maintaining the data adaptation part 11, the encoder 12 and the decoder 13 frozen (Step S2). Training is performed on the source distribution in a supervised manner. For example, sensor data items X from the labelled dataset are input to the model and corresponding vectors C' are determined. Parameters of the classifier 14 are updated based on a comparison between the vectors C' and the class labels C. In contrast, parameters of the data adaptation part 11, encoder 12 and decoder 13 are not updated at this stage. The comparison between vectors C' and class label C may be based on the cross-entropy loss between the distribution of the actual prediction (vector C') and the ground-truth distribution (class label C) belonging to that category. The comparison and update may be performed items by items or by batches.

At this stage, the machine learning model 10 is able to discriminate the categories accurately for a test sample taken from the source distribution.

In embodiments where the training apparatus 3 and the sensing apparatus 4 are distinct devices, the training apparatus 3 deploys the machine learning model 10 in the sensing apparatus 4 (step S3). At this stage, the machine learning model 10 is partially trained: The encoder 12, the decoder 13 and the classifier 14 have been trained, while the data adaptation part 11 has remained frozen.

Deploying at step S3 may mean sending data representative of the structure and/or parameters of the partially trained machine learning model 10 to the sensing apparatus 4, either directly or through some intermediate device, for example a model sharing platform. The training apparatus 3 may deploy the machine learning model 10 in a plurality of sensing apparatus 4. This allows providing the partially trained machine learning model 10 to multiple sensing apparatus 4 without the need to repeat steps S1 and S2. The same partially trained machine learning model 10 may be deployed to a plurality of sensing apparatus 4 which may be used in different sensing contexts, for example by different users.

FIG. 4 is a flowchart of a method for training and using the machine learning model 10. In some embodiments, the method of FIG. 4 is executed by the sensing apparatus 4.

In embodiments where the training apparatus 3 and the sensing apparatus 4 are distinct devices, the sensing apparatus 4 obtains the partially trained machine learning model 10 from the training apparatus 3 (Step T1).

The sensing apparatus 4 obtains one or more sensor data items X from the sensors 5 (Step T2). The class C associated with a sensor data item X may be unknown. For example, the sensing apparatus 4 collects EMG sensor data, but the corresponding gesture is not explicitly input to the sensing apparatus 4.

Then, the sensing apparatus 4 trains the data adaptation part 11 based on the one or more sensor data items X while maintaining the encoder 12, the decoder 13 and the classifier 14 frozen (Step T3). Training is performed on the target distribution in an unsupervised manner (i.e. without the use of the class label). For example, sensor data items X obtained at step T2 are input to the model and corresponding decoded sensor data items Y are determined. Parameters of the data adaptation part 11 are updated based on a comparison between the sensor data items X and the decoded sensor data items Y. In contrast, parameters of the encoder 12 and the decoder 13 are not updated at this stage. The comparison between sensor data items X and the sensor data items Y may be based on the average mean square error between X and Y. The comparison and update may be performed items by items or by batches.

Steps T2 and T3 may be repeated until a stop condition is met, for example based on a number of sensor data items X processed and/or a time constraint.

At this stage, the machine learning model 10 is able to discriminate the categories accurately for a test sample taken from the target distribution. Accordingly, the sensing apparatus 4 may use the machine learning model for inference (Step T4). For example, the sensing apparatus 4 obtains a sensor data item X from the sensors 5 and use the trained machine learning model 10 for determining the class associated with it. The sensing apparatus 4 may control the execution of an action based on the determined class (Step T5). For example, the sensing apparatus 4 obtains EMG sensor data, uses the machine learning model 10 to determine the corresponding hand gesture performed by the user, and uses the recognized hand gesture as part of a user interface, for example for changing content displayed by the sensing apparatus 4.

Steps T4 and T5 may be repeated. For example, by performing successive hand gestures recognized by the sensing apparatus 4, a user inputs successive commands to the sensing apparatus 4.

Also, retraining may be performed (step T2 and T3), for example to take evolving sensing condition into account.

FIGS. 3 and 4 shows a three phases training of the machine learning model 10.

In the first phase (step S1), the encoder 12 and the decoder 13 are trained while maintaining the rest frozen. Unsupervised learning based on the source distribution is applied.

In the second phase (Step S2), the classifier 14 is trained while maintaining the rest frozen. Supervised learning based on the source distribution is applied.

In the third phase (Step T3), the data adaptation part 11 is trained while maintaining the rest frozen. Unsupervised learning based on the target distribution is applied.

It can be appreciated that unsupervised data adaptation is performed, without the need of any information related to the target distribution for the initial training based on the source distribution: The first and second phases do not use information about the target distribution. Moreover, the third phase does not require labelled data.

In some embodiments, the three training phases are performed by the training apparatus 3 (First and second phases) and the sensing apparatus 4 (third phase). Accordingly, a training apparatus 3 and a sensing apparatus 4 may be regarded as interrelated products because they complement each other and work together.

FIG. 5 is a block diagram representing the structural architecture of an apparatus 20. The apparatus 20 may correspond to the training apparatus 3, to the sensing apparatus 4 or a combination thereof.

The apparatus 20 comprises a processor 21 and a memory 22. The memory 22 stores computer program code P. The memory 22 and the computer program code P are configured for, with the processor 21, causing the apparatus 20 to perform, at least in part, the method described with reference to FIG. 3 and/or FIG. 4.

In the context of this description, a machine learning model is a function for outputting an output based on an input, which depends on trainable parameters. An example of machine learning model is a neural network, with weights and biases as parameters. Training the machine learning model is the task of determining the parameters of the model based on training data.

It should be noted that although examples of methods have been described with a specific order of steps, this does not exclude other implementations. In particular, the described steps may be executed in another order, partially or totally in parallel . . . .

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

While the principles of the invention have been described above in connection with specific embodiments, it is to be clearly understood that this description is made only by way of example and not as a limitation on the scope of the invention, as defined in the appended claims.

The invention claimed is:

1. An apparatus comprising:
at least one processor; and at least one memory storing instructions that, when executed by the at least one processor, cause the apparatus to
use a trained machine learning model to infer a class of gesture associated with one or more obtained bio sensor data items, and
control an execution of an action based on the inferred class of gesture such that a gesture-based interface is enabled,
wherein the trained machine learning model comprises
a data adaptation part configured to determine a modified sensor data item based on the one or more obtained bio sensor data items,
an encoder configured to determine encoded features based on the modified sensor data item from the one or more obtained bio sensor data items,
a decoder configured to determine a decoded sensor data item based on the encoded features, representing an estimation of the one or more obtained bio sensor data items, and
a classifier configured to determine the class associated with the one or more obtained bio sensor data items, based on the encoded features, and
wherein the trained machine learning model is configured to be retrained by updating parameters of the data adaptation part based on the one or more obtained bio sensor data items and a corresponding decoded sensor data item.

2. The apparatus of claim 1, wherein updating the parameters of the data adaptation part includes updating the parameters in response to a change in at least one of an inter-session or an inter-subject condition.

3. The apparatus of claim 2, wherein the updating the parameters of the data adaption part includes unsupervised learning.

4. The apparatus of claim 1, further comprising:
one or more sensors configured to obtain the one or more obtained bio sensor data items.

5. The apparatus of claim 4, wherein the one or more sensors are configured to perform at least one of Electromyography (EMG), Electroencephalography (EEG), Electrocardiography (ECG), or Photoplethysmogram (PPG).

6. The apparatus of claim 1, wherein the one or more obtained bio sensor data items are obtained through at least one of Electromyography (EMG), Electroencephalography (EEG), Electrocardiography (ECG), or Photoplethysmogram (PPG).

7. An apparatus comprising:
at least one processor; and
at least one memory storing instruction that, when executed by the at least one processor, cause the processor to
use a trained machine learning model to infer a class of gesture associated with one or more obtained bio sensor data items, and
control an execution of an action based on the inferred class of gesture such that a gesture-based interface is enabled,
wherein the trained machine learning model comprises
a data adaptation part configured to determine a modified sensor data item based on the one or more obtained bio sensor data items and at least one parameter and to update the at least one parameter in response to a change in at least of an inter-session or an inter-subject condition,
an encoder configured to determine encoded features based on the modified sensor data item from the one or more obtained bio sensor data items,
a decoder configured to determine a decoded sensor data item based on the encoded features, representing an estimation of the one or more obtained bio sensor data items, and
a classifier configured to determine the class associated with the one or more obtained bio sensor data items, based on the encoded features.

8. The apparatus of claim 7, further comprising:
one or more sensors configured to obtain the one or more obtained bio sensor data items.

9. The apparatus of claim 8, wherein the one or more sensors are configured to perform at least one of Electromyography (EMG), Electroencephalography (EEG), Electrocardiography (ECG), or Photoplethysmogram (PPG).

10. The apparatus of claim 7, wherein the one or more obtained bio sensor data items are obtained through at least one of Electromyography (EMG), Electroencephalography (EEG), Electrocardiography (ECG), or Photoplethysmogram (PPG).

11. The apparatus of claim 7, wherein the updating the at least one parameter in response to the change in at least of the inter-session or the inter-subject condition includes updating the parameters of the data adaptation part based on the one or more obtained bio sensor data item and a corresponding decoded sensor data item, while the encoder, the decoder, and the classifier are frozen.

12. The apparatus of claim 11, wherein the updating the parameters of the data adaptation part includes unsupervised learning.

* * * * *